United States Patent Office 3,024,167
Patented Mar. 6, 1962

3,024,167
LYOPHILIZED PROTEIN HYDROLYSATE SUITABLE FOR PARENTERAL ADMINISTRATION
Charles W. Damaskus, La Grange, Ill., assignor, by mesne assignments, to Armour & Company of Delaware, Chicago, Ill., a corporation of Delaware
No Drawing. Filed Feb. 6, 1959, Ser. No. 791,520
3 Claims. (Cl. 167—65)

This invention relates to lyophilized protein hydrolysate products suitable for parenteral administration. It is also related to lyophilization products which, in addition to hydrolyzed protein, contain water-soluble vitamins, carbohydrates, and various other biologically active substances. The invention is also related to a method for the preparation of such products.

This patent application is in part a continuation of my co-pending patent application Serial No. 650,289, filed April 3, 1957, now abandoned.

Protein Hydrolysate Injection is a well-known product on the pharmaceutical market today. It is used as a parenteral intravenous nutrient and contains, in sterile solution, the amino acids derived from the protein which may be casein, fibrin, plasma, lact-albumin, or other suitable materials. In most cases, some of the essential heat labile amino acids are destroyed during the hydrolysis procedure and, therefore such acids, notably DL tryptophane and DL methionine, are added to the protein hydrolysate subsequent to the hydrolyzation procedure. Protein Hydrolysate Injection also may contain dextrose or other carbohydrates suitable for intravenous infusion. Variations of the product include some products wherein various vitamins are added to the solution. It is generally required that from 40 to 70% of the total nitrogen present be in the form of α-amino nitrogen.

The product, Protein Hydrolysate Injection, has heretofore been sold in the form of a sterile solution. The product, therefore, has great weight and bulk. In addition to being cumbersome in form, the now commercially available products have the additional disadvantage of being unstable. This disadvantage is pointed out by the fact that manufacturers of such liquid products must print detailed cautionary instructions concerning storage on the containers of such solutions. It is also noted by the users of such products that after a short period of storage (particularly if the solutions are not kept cool) the solutions become cloudy and materials begin to precipitate from the solutions. As pointed out later in this specification the lyophilized product of this invention overcomes these disadvantages since it is very stable even at room temperatures.

Though lyophilization procedures have been applied to a great many substantially similar products, such procedures have not been employed with regard to Protein Hydrolysate Injection due to the problem of "foaming," otherwise known as "melt back" or "puffing." In the ordinary lyophilization procedures, the solution to be lyophilized is first frozen at about −60° F. and is then subjected to a high vacuum. As the water sublimes from the frozen state, the temperature gradually rises. At some particular point during this procedure, as the temperature rises, the solution often foams, so rising out of the container. Even after lyophilization is complete, solutions which have foamed or melted back to some degree, are reconstituted with distilled water with great difficulty.

It is an object of this invention to overcome the foaming problem as it arises in connection with the lyophilization of Protein Hydrolysate Injection and similar preparations. It is a further object of the invention to provide parenteral nutrient products which are easily utilized and are in conveniently transportable form. It is also an object to provide a parenteral nutrient product in a very stable form and in which added vitamins have enhanced stability.

Other objects and advantages of the invention will appear as the specification proceeds.

It has now been discovered that when a partially hydrolyzed gelatin is included with the protein hydrolysate, the gelatin and protein hydrolysate can be lyophilized without the foaming problem becoming apparent to any appreciable extent. In this procedure, it is very critical that the gelatin be hydrolyzed to a particular degree. We have found that non-hydrolyzed gelatin is ineffective as is gelatin which has been hydrolyzed until the hydrolysis is substantially complete.

The gelatin hydrolysates useful in these procedures have a gel point of about 15 to 20° C. in 26 to 35% aqueous solutions. This degree of hydrolysis is conveniently achieved by placing gelatin in aqueous solution in an autoclave at temperatures of approximately 250° F. at pressures of about 15 pounds per square inch for about 3 hours. The same degree of hydrolysis of course can be achieved though the specific means or conditions of hydrolysis are varied. For instance, when lower conditions of temperature and pressure are used, the same hydrolysis is achieved if the process is allowed to continue over a greater period of time. Likewise, if temperature or pressure are raised, the period of hydrolysis may be shortened. In this invention, it is the degree of hydrolysis which is important rather than the particular means or conditions of hydrolysis. The gelatin hydrolysate is ordinarily incorporated into the protein hydrolysate solution in the form of a 26 to 35% aqueous solution.

The gel point of the partially hydrolyzed gelatin may be determined by any of several recognized methods. One such method has been reported in an article by Ferry and Gordon in Federation Proc., 5.136 (1946), who placed gels in test tubes, then inverted the tubes and observed the temperature at which the gel slumped. A preferred method is that of Jerome Vinograd reported in "Chemical Studies of Oxypolygelatin and Other Plasma Volume Expanders," California Institute of Technology, Army Contract D.A.-49-007-MD-298. In this preferred method a neoprene ball is imbedded in 10 ml. of gel in a ¾″ by 6″ Pyrex test tube. The temperature of the gel is raised at a rate of about 5° C. per hour. The melting point is taken at the temperature of the solution when the ball reaches the bottom of the test tube. The temperature change during the travel of the ball is from 0.1 to 0.4° C.; at the end of this travel the solution is freely mobile. Measurement of the bath temperature in the gel showed that during the entire warming the temperature lag did not exceed .01° C.

In routine use the bath is chilled to 1.0° C. before the tubes of gel are brought into the unit. Many measurements can be performed simultaneously.

The protein hydrolysate employed herein may be derived from a protein selected from the group consisting of casein, plasma and fibrin. Such a protein may be hydrolyzed by acid or enzymatic hydrolysis or other suitable methods. The protein hydrolysate is hydrolyzed to a state of physiological acceptance in which approximately 40 to 70% of the total nitrogen content is α-amino nitrogen. The standards for an acceptable protein hydrolysate for injection are set forth in U.S. Pharmacopoeia, 15th Revision, at page 591. It should be particularly noted that the standards for protein hydrolysates for injection are detailed and require, among other stated things, that the injection be free of thermogenic response and not give rise to foreign protein reactions. Many such protein hydrolysates for injection are commonly known to the skilled in the art.

We have discovered that the lyophilized product of this invention has a unique type of reconstitution with distilled water. The reconstitution may be characterized as not occurring instantaneously, but instead, a controlled solubilization occurs which is facilitated by a general release of sterile entrapped air, or an inert gas such as nitrogen, from the lyophilized product.

These reconstitution characteristics may be illustrated by the following experiment in which two sample bottles of lyophilized casein hydrolysate, each containing 8½ g. of casein hydrolysate, 1½ g. of hydrolyzed gelatin and 10 g. of dextrose and approximately ½ g. of vitamins, were placed in stationary position and 235 cc. of PF distilled water was added. The following results were obtained:

| Sample | Time required for complete solubilization |
| --- | --- |
| Bottle No. 1 water at 26° C | 7 min. 9 sec. |
| Bottle No. 2 water at 24° C | 5 min. 28 sec. |

Thus it is seen that reconstitution of the lyophilized product is controlled even though no agitation is used. Complete solubilization is achieved in much less time, about one minute when the samples are agitated.

This phase of the experimentation also pointed out that the partially hydrolyzed gelatin has a solubilizing effect on dextrose. To show the contrasting solubility characteristics when no gelatin is used 6 by 50 cc. vials were filled with 15 cc. of a 12% dextrose solution, then frozen and lyophilized. This amount of dextrose is proportionately the same ratio as is being used in the lyophilized protein hydrolysate product. When distilled water was added to the vials the contents were not solubilized within 25 minutes. This would indicate that the partially hydrolyzed gelatin has a marked effect on the solubilization of dextrose, since in the product containing hydrolyzed gelatin solubilization was effected in a very much shortened time.

It has also been discovered that the vitamins contained in the product of this invention demonstrate better stability than would be expected. In determining the stability of vitamins in the lyophilized product $B_1$, $B_2$, niacin and pantothenic acid assays were conducted. Samples containing these vitamins were reconstituted at various time intervals as indicated in the chart below. All samples were assayed simultaneously on the 28th day. The $B_6$ and pantothenic acid values are averages of the assays conducted on the 28th and 29th days.

All samples were reconstituted with sterile pyrogen free water of pH 6.0 and held at room temperature until tested.

| Reconstituted at— | $B_1$, mg./btl. | $B_2$, mg./btl. | Niacin, mg./btl. | $B_6$, mg./btl. | Pantothenic, mg./btl. |
| --- | --- | --- | --- | --- | --- |
| 0 day | 75.6 | 7.50 | 278 | 10.04 | 62.81 |
| 14th day | 74.5 | 7.13 | 295 | 10.54 | 63.15 |
| 21st day | 73.3 | 5.75 | 270 | 10.79 | 65.78 |
| 28th day | 67.5 | 7.43 | 270 | 9.84 | 63.85 |

The following examples will illustrate various specific embodiments of the invention.

EXAMPLE I

*Preparation of Lyophilized Casein Hydrolysate Injection*

A. CASEIN HYDROLYSATE

A 6% solution of casein hydrolysate obtained commercially was concentrated by vacuum distillation to 23.2%. Approximately 69% of the total nitrogen present in this solution was in the form of α-amino nitrogen.

B. PREPARATION OF PARTIALLY HYDROLYZED GELATIN

Gelatin with the following specification was used:

| | |
| --- | --- |
| Bloom | 250. |
| pH | 4.5–4.8. |
| Moisture | 8%. |
| Color | Scale 170 (very light). |
| Ash | 0.3%. |
| Fat (ether extract) | 0.0% |
| Protein | 91.7%. |
| Arsenic, lead and $SO_2$ | Less than 1 part per million. |
| Zinc and copper | Less than 10 parts per million. |
| Calories | 3.59 per gram. |

382 cc. of hot PF, i.e. pyrogen-free water was placed in a 500 cc. Pyrex bottle and 180 grams of gelatin was added to the water with agitation. The mouth of the Pyrex bottle was stoppered and sealed with an aluminum cap. The bottle was then placed in an autoclave and maintained at a temperature of 250° F. for 3 hours. After autoclaving the gelatin was sterile filtered and stored.

C. FORMULATION OF PRODUCT 1470 cc. of 23.2% casein hydrolysate (obtained from step A) was placed in a Pyrex beaker. 188 cc. of hydrolyzed gelatin (obtained from step C) was added to the casein hydrolysate. Any desirable vitamins and similar additives may be added to the product at this point. In this particular example there was added with agitation the following items.

| | G. |
| --- | --- |
| Thiamine | 3.340 |
| Riboflavin | .340 |
| Pyridoxine | .340 |
| Calcium pantothenate | 2.660 |
| Nicotinamide | 13.320 |
| Dextrose | 400.000 |
| Sodium ethylmercurithiosalicylate | 1.000 |

The total volume of the solution was brought up to 3.080 l. with warm PF distilled water and then agitated. The pyrogen-free (PF) water as well as the entire product, must, of course, meet the requirements of the pyrogen test which is given on pages 883–884 of the fifteenth revision of the U.S. Pharmacopoeia.

D. STERILIZATION, BOTTLING AND LYOPHILIZATION

The formulation as indicated above was then sterile filtered through an E–9 pad and collected as a sterile solution in a bottom drain bottle. The solution was then aseptically filled 77 cc. into 250 cc. brown bottles. The bottle openings were then covered with double sterile nylon cloth squares which were tied on with sterile string.

The contents of the bottles were frozen in a −60° F. freezer at an approximately 30° angle. The bottles are then placed in a lyophilizer and the pressure decreased to 50–150 microns. After 24 hours of lyophilization, the contents of the bottles have a moisture of less than 5%. The bottles are then removed from the lyophilizer and aseptically stoppered.

This product reconstituted readily with PF distilled water.

EXAMPLE II

*Preparation of Lyophilized Bovine Hydrolysate Injection*

A bovine plasma hydrolysate obtained commercially was concentrated to 20%. Approximately 55% of the total nitrogen present in this solution was in the form of α-amino nitrogen.

In the formulation of the product 1705 cc. of the 20% solution was placed in a beaker. 188 cc. of hydrolyzed gelatin (prepared as outlined in step B of Example I) was added to the bovine plasma hydrolysate solution. At this point any desired vitamins and similar additives may be added to the product. In the preparation of this particular product there was added with agitation the same materials as were added in step C of Example I.

The total volume of the solution was then brought up to 3.080 l. with warm PF distilled water and then agitated.

This product was sterilized, bottled and lyophilized exactly as was done in Example I above or by any other suitable means.

EXAMPLE III

*Preparation of Lyophilized Fibrin Hydrolysate Injection*

In the preparation of a fibrin hydrolysate injection a 5% solution of modified fibrin hydrolysate also containing 5% dextrose was concentrated to 20% protein. This raw material is commercially available. Approximately 58% of the total nitrogen present in this solution was in the form of α-amino nitrogen. In the preparation of this product, lyophilized gelatin was added as indicated in previous examples. Similar vitamins and other additives were admixed in the preparation. In this particular example the identical additives mentioned in Example I were prepared with one exception, that is that only 200 g. of dextrose were added to the product.

This product was sterilized, bottled and lyophilized as in Example I.

EXAMPLE IV

In a larger scale preparation of hydrolyzed gelatin, 7.2 l. of hot PF water was placed in a 20 l. Pyrex bottle and 2.7 kg. of gelatin was added to the water with agitation. The mouth of the Pyrex bottle was closed with a stopper equipped with a vent and the bottle was placed on a pan in an autoclave and maintained at a temperature of 250° F. for 3 hours. After autoclaving, the gelatin was filtered through a sterile pad and thereafter maintained at a refrigerated temperature of about 37° F. until used in the formulation of the product.

EXAMPLE V

In a larger scale formulation of the product a 100 gallon tank was first scrubbed and rinsed with PF distilled water. 60 l. of 20% casein hydrolysate prepared as indicated in step A of Example I was placed in the tank. Since this casein hydrolysate was deficient in DL tryptothane and DL methionine, these particular amino acids were added in the ratio of 1 g. of each acid to each 85 g. of solids in the casein hydrolysate solution. A solution of hydrolyzed gelatin (32% solids) prepared substantially as indicated in step D of Example I containing 1950 g. of gelatin solids was added to the casein hydrolysate. At this point it is convenient to add vitamins and other desirable additives to the product. In this particular preparation there was added with agitation the following materials:

| | | |
|---|---|---|
| Thiamine | g | 108.5 |
| Riboflavin | g | 11.05 |
| Pyridoxine | g | 11.05 |
| Calcium pantothenate | g | 86.45 |
| Nicothinamide | g | 432.9 |
| Dextrose | kg | 13 |

The total volume of this solution was brought up to 100.1 l. with PF distilled water and agitated for about 30 minutes. If desired, DL tryptothane and DL methionine may be incorporated in the solution at this point in the formulation rather than prior to the addition of the hydrolyzed gelatin.

This product was sterilized, bottled and lyophilized exactly as done in Example I.

EXAMPLE VI

A product was prepared according to the method set forth in Example I, except that the gelatin described in section B of Example I was not autoclaved. The product, containing the unhydrolyzed gelatin, was formulated as in section C and sterilized, bottled, and frozen as in section D. However, during the subsequent lyophilization step, it was noticed that the surface moisture sublimated and formed a solid, non-porous surface layer, thus preventing the residual moisture in the lower portion of the cake from permeating through the surface. Also, during the latter stages of the lyophilization cycle, there was an undesirable darkening of the lower portion of the cake. The resulting product was pharmaceutically unacceptable in terms of appearance, toxicity, and reconstitution characteristics. The data obtained in this example demonstrates the unsatisfactory nature of the product obtained using a gelatin having a gel point greater than 15 to 20° C.

EXAMPLE VII

A product was prepared according to the method set forth in Example I, except that the gelatin described in section B of Example I was autoclaved for six hours and had at the end of that time a gel point range of 12 to 15° C. The product, containing this gelatin, was formulated as in section C and sterilized, bottled, and frozen as in section D. However, during the subsequent lyophilization step, it was noticed that the ingredients in the container softened and the contents blew out and formed a dry foam, as a result of which a product was obtained which was not pharmaceutically elegant or acceptable. The data in this example demonstrates the unsatisfactory nature of the product obtained using a gelatin having a gel point lower than 15 to 20° C.

While in the foregoing specification various embodiments of this invention have been set forth and specific details thereof elaborated for purposes of illustration, it will be apparent to those skilled in the art that this invention is susceptible of many modifications and embodiments and that all such embodiments are within the basic concept and scope of the invention.

I claim:

1. A lyophilized protein hydrolysate preparation capable of being reconstituted as a solution suitable for parenteral administration, comprising a protein hydrolysate derived from a protein selected from the group consisting of casein, plasma and fibrin and a gelatin hydrolysate having a gel point of about 15 to 20° C. in a 26 to 35% aqueous solution thereof, said preparation containing in the lyophile state about 1 to 2 parts of gelatin hydrolysate for each 9 parts of protein hydrolysate.

2. A lyophilized protein hydrolysate preparation capable of being reconstituted as a solution suitable for parenteral administration, comprising a protein hydrolysate derived from a protein selected from the group consisting of casein, plasma and fibrin, a gelatin hydrolysate having a gel point of about 15 to 20° C. in a 26 to 35% aqueous solution, and at least one water-soluble vitamin, said preparation including in the lyophile state about 1 to 2 parts of gelatin hydrolysate for each 9 parts of protein hydrolysate.

3. In a process for preparing a protein hydrolysate suitable for parenteral administration, the steps of forming an aqueous mixture of a protein hydrolysate derived from a protein selected from the group consisting of casein, plasma and fibrin and a gelatin hydrolysate having a gel point within the range of from about 15 to 20° C. in a 26 to 35% aqueous solution thereof, said gelatin hydrolysate being included in the aqueous mixture in the ratio of about 1 to 2 parts for each 9 parts of the protein hydrolysate, and lyophilizing said aqueous mixture.

References Cited in the file of this patent

UNITED STATES PATENTS

| | | |
|---|---|---|
| 2,180,637 | Kemmerer | Nov. 21, 1939 |
| 2,411,897 | Sahyun | Dec. 3, 1946 |
| 2,591,133 | Campbell et al. | Apr. 1, 1952 |
| 2,738,299 | Frost et al. | Mar. 13, 1956 |
| 2,824,092 | Thompson | Feb. 18, 1958 |
| 2,827,419 | Tourtellotte et al. | Mar. 18, 1958 |

(Other references on following page)

FOREIGN PATENTS

| | | |
|---|---|---|
| 618,910 | Great Britain | Mar. 1, 1949 |
| 742,594 | Great Britain | Dec. 30, 1955 |

OTHER REFERENCES

U.S.D., Dispensatory of the U.S. of A., 25th Ed., 1955, J. B. Lippincott Co., Philadelphia, Pa. Part I: pp 32–34 (Serum Albumin); pp. 179–190 (Human Blood); pp. 580–581 (Human Fibrin); pp. 598–601 (Gelatin); pp. 1071–1076 (Human Plasma); pp. 1140–1141 (Protein Hydrolysate Injection, U.S.P.); p. 1425 (Thrombin). Part II: pp. 1540–1544 (Amino Acids); p. 1617 (Casein); pp. 1811–1815 (Plasma Extenders).